United States Patent [19]

Halls et al.

[11] 3,919,831
[45] Nov. 18, 1975

[54] CROP HARVESTING MACHINE CONVERTIBLE BETWEEN FIELD OPERATING AND ROAD TRANSPORTING ORIENTATIONS

[75] Inventors: Lawrence M. Halls; Shaun A. Seymour, both of New Holland, Pa.

[73] Assignee: Sperry Rand Corporation, New Holland, Pa.

[22] Filed: Jan. 24, 1975

[21] Appl. No.: 544,029

[52] U.S. Cl. .............................. 56/228; 280/415 R
[51] Int. Cl.² ........................................ A01D 75/22
[58] Field of Search ................... 56/228, 2, 1, 14.4; 280/415 R; 172/240, 245

[56] References Cited

UNITED STATES PATENTS

| | | | |
|---|---|---|---|
| 1,919,440 | 7/1933 | MacGregor et al. | 56/228 |
| 2,352,479 | 6/1944 | Huddle | 56/228 |
| 3,610,661 | 10/1971 | Pierce et al. | 280/415 R |
| 3,683,605 | 8/1972 | Jakobi | 56/228 |
| 3,763,637 | 10/1973 | Schmitt | 56/228 |
| 3,832,837 | 9/1974 | Burkhart et al. | 56/218 |
| 3,868,811 | 3/1975 | Cicci et al. | 56/1 |

*Primary Examiner*—Russell R. Kinsey
*Attorney, Agent, or Firm*—John R. Flanagan; Frank A. Seemar; Joseph A. Brown

[57] ABSTRACT

A crop harvesting machine has a mobile frame which includes a main frame portion supporting a harvesting header along a forward side thereof and a mobile auxiliary frame portion supporting the main frame portion in overlying relation and pivotal in relation thereto about a vertical axis. When the machine is in its field operating orientation, the auxiliary frame portion aligns the main frame portion and header in transverse relationship to the forward direction of machine movement. The machine further has an elongated draft member pivotally mounted about a vertical axis at a central location along the main frame portion and extending longitudinally forward over the header to a forward end adapted for securement to a towing tractor. Conversion of the machine to a road transporting orientation involves: first, actuation of controls for elevating the machine with respect to the field and; then, in coordinated fashion, pivoting the auxiliary frame portion and draft member relative to the main frame portion so as to realign the main frame portion and header generally parallel to the draft member and the forward direction and transverse to the auxiliary frame portion.

31 Claims, 14 Drawing Figures

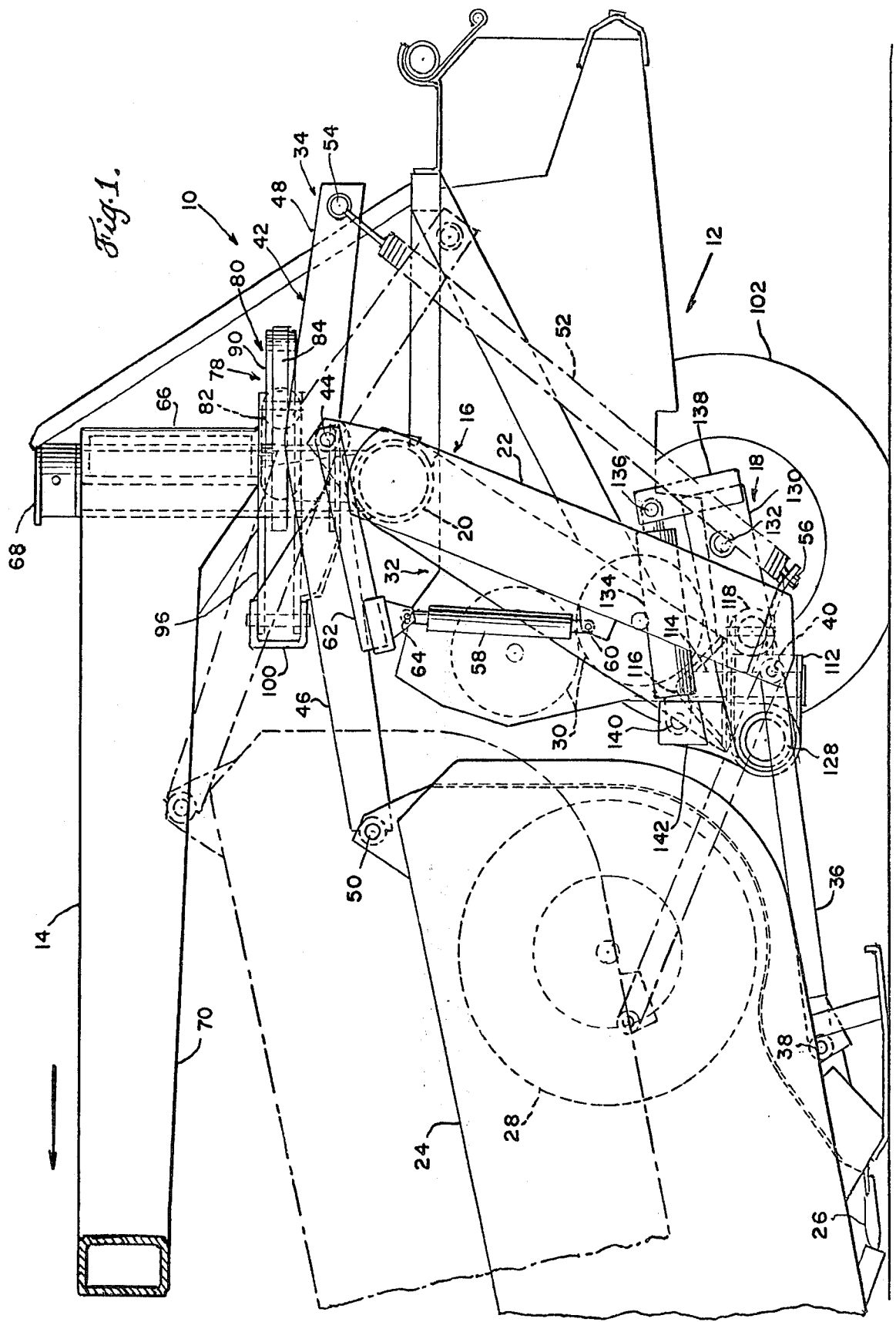

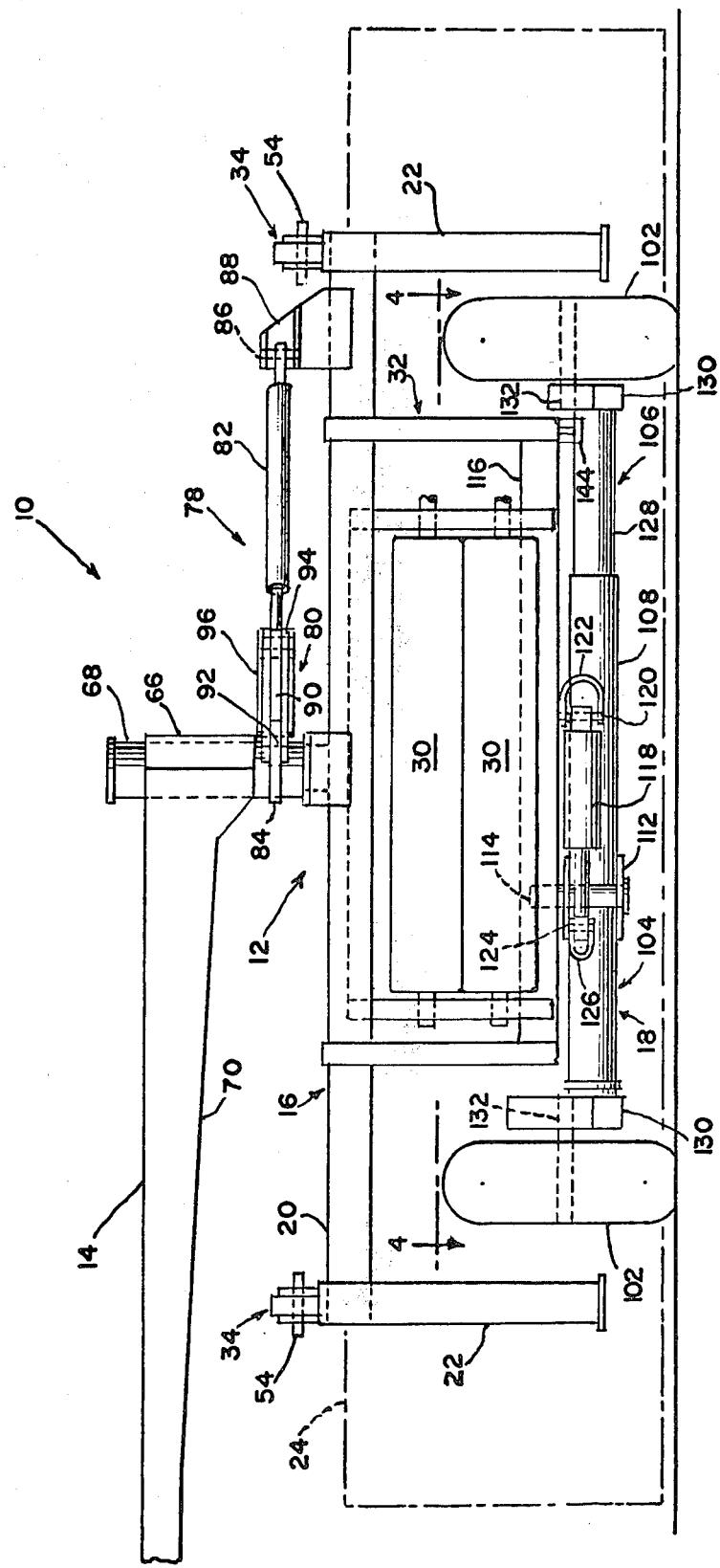

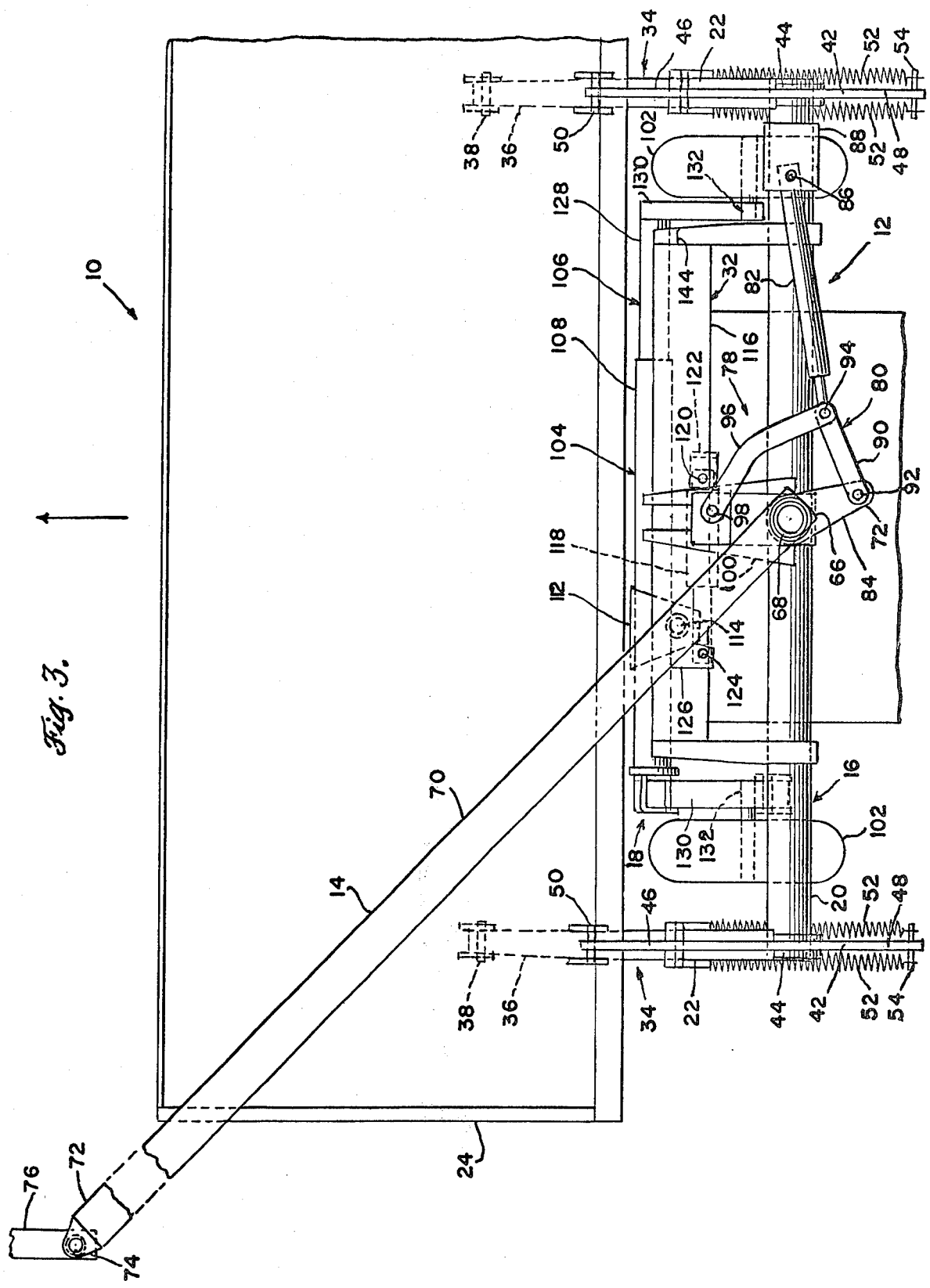

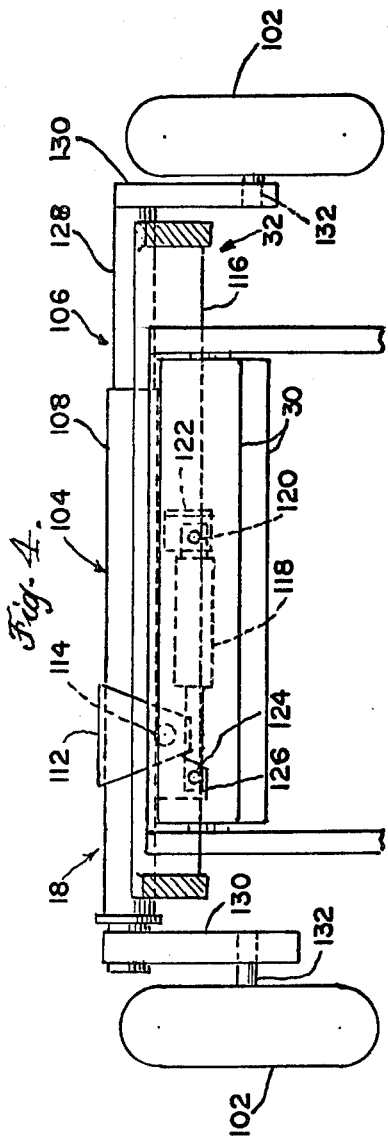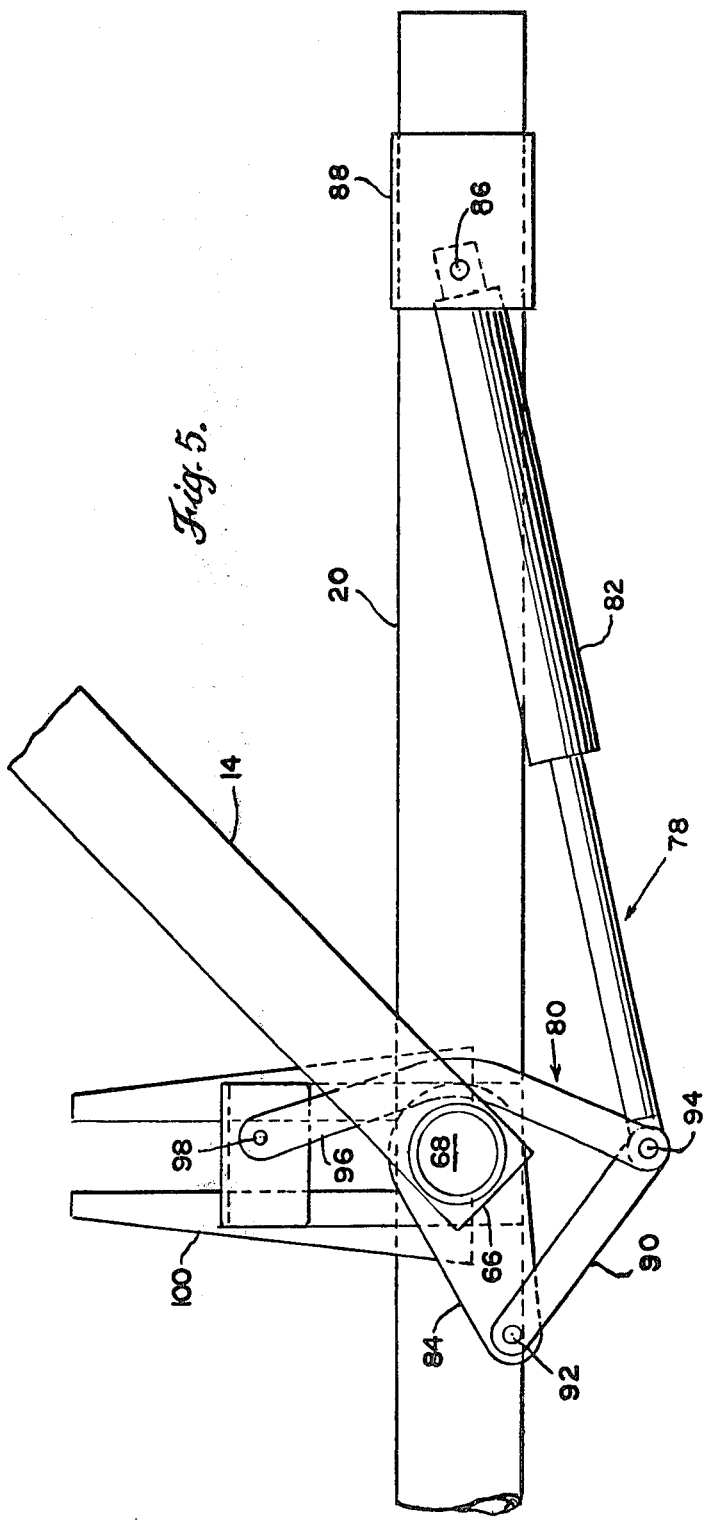

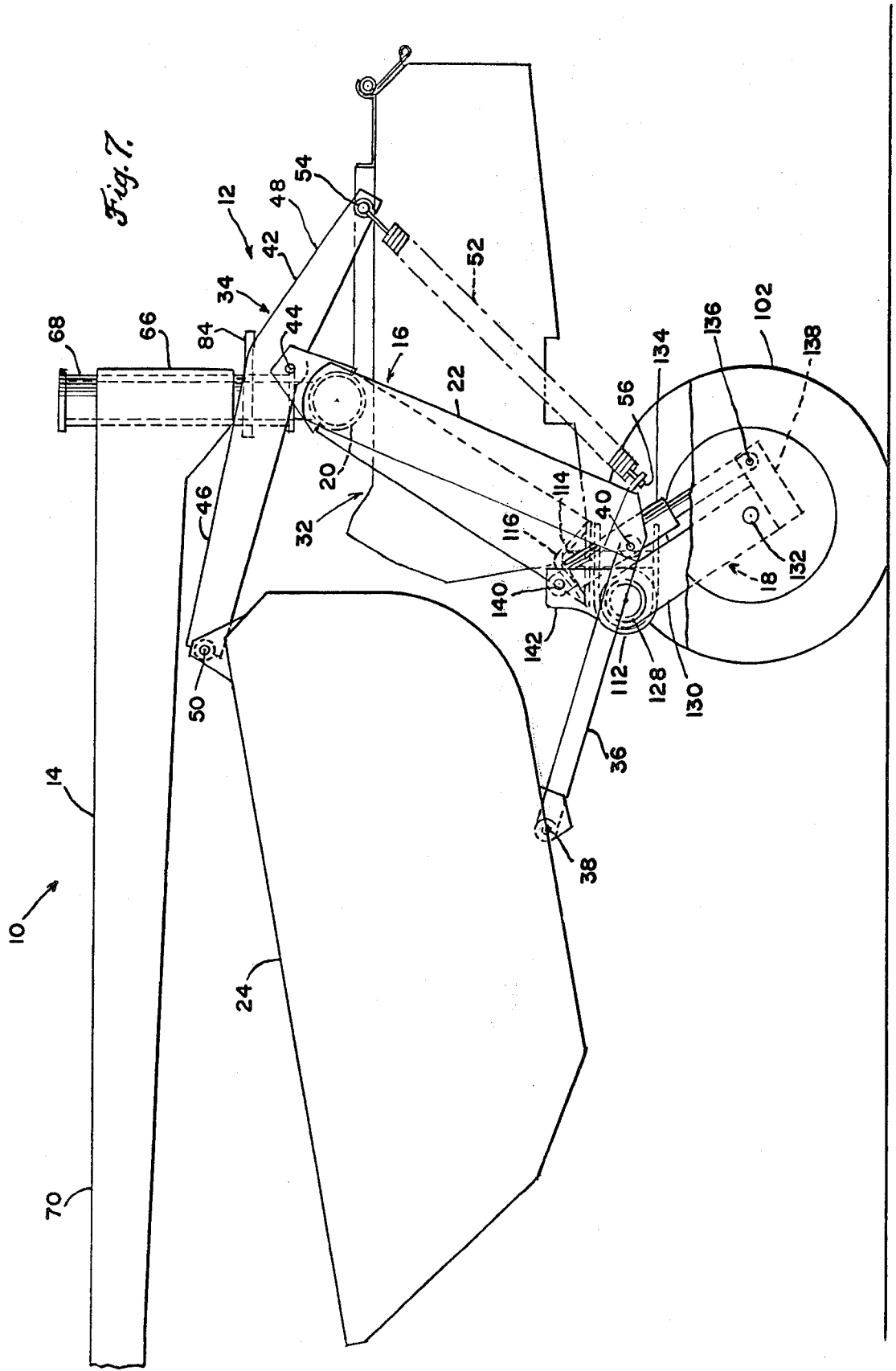

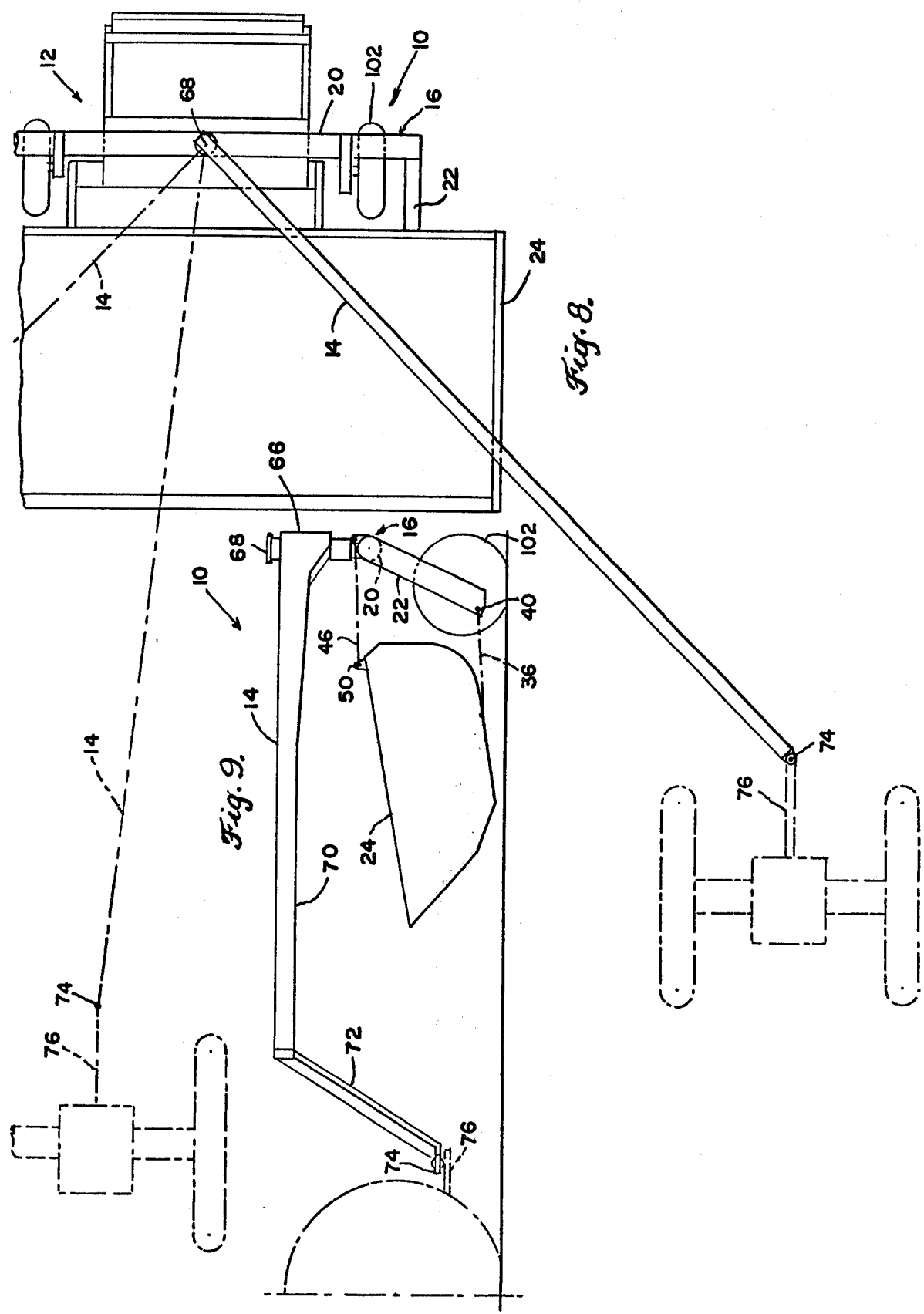

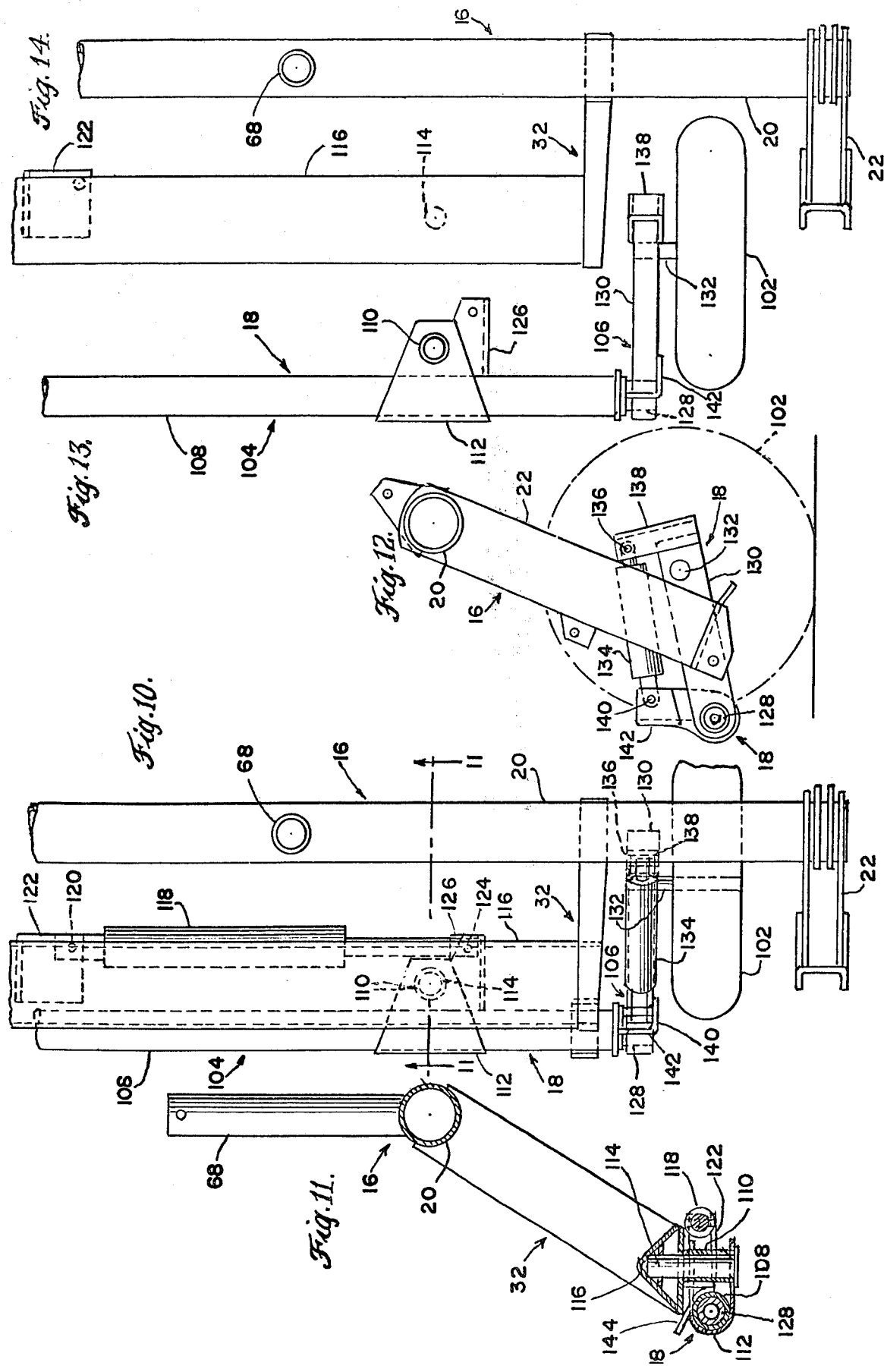

CROP HARVESTING MACHINE CONVERTIBLE BETWEEN FIELD OPERATING AND ROAD TRANSPORTING ORIENTATIONS

CROSS REFERENCES TO RELATED APPLICATIONS

Reference is hereby made to the following co-pending U.S. applications dealing with related subject matter and assigned to the assignee of the present invention:

1. "Pull-Type Crop Harvesting Machine Disposable at a Plurality of Offset Harvesting Positions Behind a Towing Vehicle" by Lawrence M. Halls, U.S. Ser. No. 544,027, filed Jan. 24, 1975.
2. "Crop Harvesting Machine Header Suspension System" by Lawrence M. Halls, U.S. Serial No. 544,028, filed Jan. 24, 1975.

BACKGROUND OF THE INVENTION

1. FIELD OF THE INVENTION

The present invention relates generally to a crop harvesting machine and, more particularly, is concerned with an improved apparatus for converting the machine between field operating and road transporting orientations.

2. DESCRIPTION OF THE INVENTION

One recent construction of a pull-type harvesting machine, such being a windrower disclosed in U.S. Pat. No. 3,832,837, provides a mobile transverse frame, a crop harvesting header suspended from the frame forwardly thereof and extending transversely to the direction of travel of the windrower and a draft member pivotally mounted at its rear end to the upper left end of the frame and longitudinally extending forwardly over the header to a forward end where it may be pivotally connected to the hitch of a tractor or other towing vehicle. A hydraulic cylinder is interconnected between the frame and the rear end of the draft member for pivoting the draft member so that it longitudinally extends forwardly over the header from the left end of the windrower at an oblique angle to the direction of travel of the windrower to dispose the windrower in a harvesting position offset from the rear right side of the tractor. The draft member may also be pivoted by the cylinder to a position in which it longitudinally extends forwardly at a slight acute angle to the right of the direction of travel of the windrower to dispose the windrower in a transporting position behind the tractor.

While the configuration and mounting arrangement of the draft member of the disclosed windrower apparently overcomes restrictions heretofore imposed on interchanging headers of varying sizes on the prior pull-type machine having draft structure which extends laterally and forwardly around an end of the header, the fact that the header remains in transverse alignment to the forward direction of travel when the windrower is in the transporting position imposes a restriction upon the maximum length of the header which may be utilized by this machine. Difficulty will be encountered in transporting the machine when using a header having a length of twelve feet or more in that the machine will be too wide in its transverse dimension to pass along many public roads or highways, over narrow bridges and through some field gates between harvesting operations.

Various methods have been employed in the prior pull-type machines to reduce the overall machine width for facilitating road transporting of the machine. One approach has been to convert the header from its field operating, transverse alignment relative to the forward direction of travel to a parallel, road transporting alignment wherein the length of the header will now extend generally parallel to the forward direction of movement. Such approach is illustrated by U.S. Pat. Nos. 2,352,479 and 2,850,863.

SUMMARY OF THE INVENTION

The present invention relates to apparatus incorporated in a crop harvesting machine, preferably a pull-type machine, which carries out the aforementioned one approach in an improved manner as compared to the manner in which such approach is carried out by the apparatus utilized in prior art machines. The improved apparatus reduces the transport width of the machine to a dimension substantially less than the length of the header and also minimizes the overall trailing length of the machine behind the tractor or other towing vehicle when the machine is in its road transporting orientation.

Accordingly, the present invention broadly relates to a crop harvesting machine, movable in a forward direction across a field and having an elongated crop material harvesting means, wherein improved apparatus for facilitating conversion of the harvesting means from field operating to road transporting orientations is provided.

More particularly, the improved apparatus includes first structure supporting the harvesting means and being pivotal in relation thereto about a generally upright axis, second structure supporting the first structure and being rotatable in relation thereto about a generally horizontal axis and rotatable spaced apart ground wheels mounted to and supporting the second structure at locations similarly offset from the horizontal rotational axis of the first and second structures.

The improved apparatus also incorporates means for rotating the second structure and ground wheels relative to the first structure so as to effect relative movement between the wheels and the first structure and thereby move the harvesting means relative to the wheels and the field between a lowered position in which the harvesting means is disposed adjacent the field and a raised position in which the harvesting means is disposed remote from the field.

Further, the improved apparatus incorporates means for pivoting the first structure and the harvesting means relative to each other about the upright axis, when the harvesting means is at its raised position, so as to facilitate conversion of the harvesting means from a field operating orientation in which the harvesting means axially extends generally transverse to the forward direction of machine movement to a road transporting orientation in which the harvesting means axially extends generally parallel to the forward direction of machine movement.

Still more particularly, the second structure includes an elongated cylindrical member rotatably supporting the first structure and spaced apart transversely extending arms respectively fixed to the cylindrical member with the ground wheels being respectively rotatably mounted to the arms. The first structure includes a tubular member concentrically mounted about the cylindrical member of the second structure between the arms thereof and a first pivot element fixed along the tubular member. The first pivot element of the first structure is concentrically arranged together with a second pivot element of the harvesting means such that the elements define the upright pivotal axis about which the first structure supports the header.

Additionally, the present invention relates to a crop harvesting machine, having a main frame and an elongated crop material harvesting header mounted to the frame, wherein the first structure of the improved apparatus supports the main frame in overlying relation and is pivotal relative thereto about the generally upright axis and the improved apparatus further includes an elongated draft member pivotally mounted at its rear end to the main frame, preferably at a central location thereon, about a generally upright axis and means coupled between the rear end of the draft member and the main frame for causing relative pivotal movement between the draft member and the frame so as to further facilitate conversion of the header from a field operating orientation of the machine in which the header is transversely aligned to the forward direction of machine movement to a road transporting orientation of the machine in which the header is aligned parallel to the forward direction of machine movement.

The preferred embodiment of the crop harvesting machine incorporating the improved apparatus of the present invention also incorporates other improved features which further contribute to the overall advantages of the machine over the prior art. Such other improved features comprise inventions claimed in other co-pending applications, crossreferenced above; however, all of the improved features of the machine are illustrated and described herein for purpose of facilitating a complete and thorough understanding of the improvement comprising the present invention.

The advantages and attainments of the machine incorporating all of these improved features will become apparent to those skilled in the art upon a reading of the following detailed description when taken in conjunction with the drawings in which there is shown and described a preferred or illustrative embodiment of the invention.

BRIEF DESCRIPTION OF THE DRAWINGS

In the course of the following detailed description reference will be frequently made to the attached drawings in which:

FIG. 1 is a fragmentary right side elevational view of the preferred embodiment of a crop harvesting machine incorporating the principles of the present invention, showing the machine header in solid line form in a lowered, field operating position and in broken line form in a raised, non-operating position and the draft member extending longitudinally forward to the left side of the machine;

FIG. 2 is a rear elevational view of the machine on a smaller scale than that of FIG. 1, showing the header in broken line form and the draft member disposed the same as in FIG. 1;

FIG. 3 is a plan view of the machine on the same scale as in FIG. 2, showing the relative positions of the draft member, mobile auxiliary frame, main frame and header when the machine is disposed in one possible field operating orientation, with the draft member disposed the same as in FIGS. 1 and 2;

FIG. 4 is a sectional plan view taken along line 4—4 of FIG. 2, showing the auxiliary frame structure;

FIG. 5 is an enlarged fragmentary plan view of the actuating means for pivoting the draft member, showing the relative positions of the components thereof when the draft member extends longitudinally forward to the right side of the machine;

FIG. 7 is a side elevational view of the machine, showing the main frame, header and draft member raised to maximum height relative to the field prior to conversion of the machine to its road transporting orientation;

FIG. 8 is a plan schematic representation of the machine with a portion of the towing tractor shown in broken line form in a left hand pulling position and a generally center position during lateral pivotal movement of the draft member of the machine from the left side to the right side of the machine;

FIG. 9 is a side elevational schematic representation of the machine with a portion of the towing tractor shown in broken line form, illustrating the overall arrangement of the machine behind the tractor when in the field operating orientation of FIGS. 1, 2 and 3;

FIG. 10 is an enlarged plan view of a fragmentary portion of the machine seen in FIG. 3, showing the first and second structures of the mobile auxiliary frame, means for rotating the structures, the main frame and means for pivoting the mobile auxiliary frame relative to the main frame;

FIG. 11 is a sectional elevational view taken along line 11—11 of FIG. 10;

FIG. 12 is an end elevational view of FIG. 10;

FIG. 13 is a plan view similar to FIG. 10, but showing only the fragmentary portion of the mobile auxiliary frame; and FIG. 14 is a plan view similar to FIG. 10, but showing only the fragmentary portion of the main frame.

DETAILED DESCRIPTION OF THE PREFERRED EMBODIMENT

Figure 6:
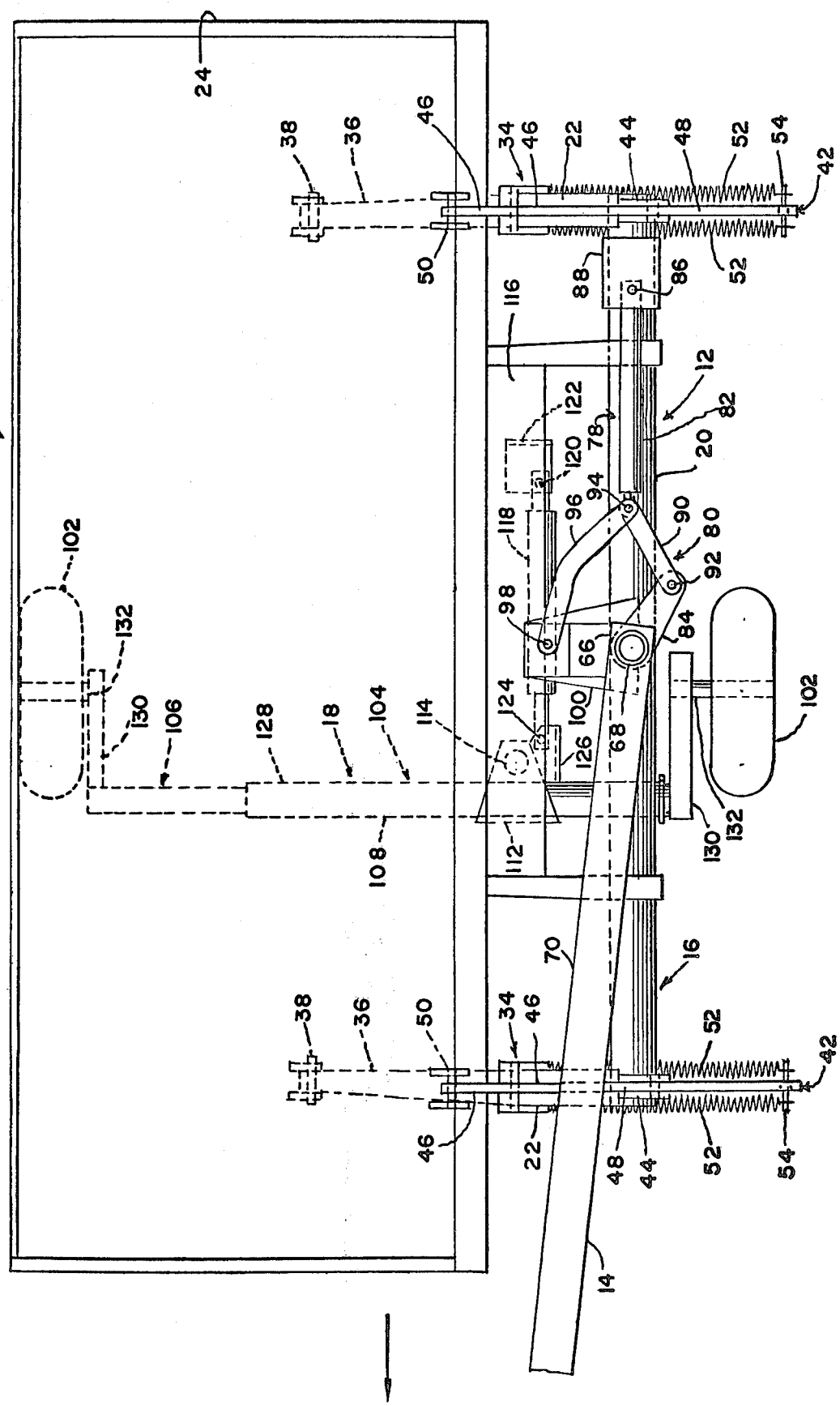
FIG. 6 is another plan view of the machine similar to that of FIG. 3, but showing the relative positions of the draft member, mobile auxiliary frame, main frame and header after the machine has been converted to its road transporting orientation.

In the following description, right hand and left hand references are determined by standing at the rear of the machine and facing in the direction of forward travel. Also, in the following description, it is to be understood that such terms as "forward," "left," "upwardly," etc., are words of convenience and are not to be construed as limiting terms.

THE CROP HARVESTING MACHINE

Referring now to the drawings, and particularly to FIGS. 1 through 3 and 9, there is shown the preferred embodiment of a crop harvesting machine being in the form of a windrower, indicated generally by numeral 10, incorporating the improved apparatus of the present invention as well as other improved features (the left side of the machine being shown in FIG. 1 when one is standing to the rear of the machine as seen in FIG. 2 and facing in the direction of forward travel as represented by the arrow in FIG. 1).

The machine 10 is a pull-type unit having a mobile frame, generally indicated by numeral 12, and a draft member 14 pivotally attached at its rear end to the frame 12 and adapted at its forward end for pivotal attachment to a tractor or other vehicle (FIG. 9) for towing the frame 12 forwardly across a field.

The frame 12 includes a main frame portion 16 supported by a mobile auxiliary frame portion 18. The main frame portion 16 includes an elongated tubular member 20 which extends transversely to the forward direction and pivotally mounts the draft member 14 at a central location therealong. A pair of side members 22 are fixed to the respective opposite ends of the tubular member 20 and similarly extend in an inclined manner downwardly and forwardly therefrom.

An elongated header 24 is disposed forwardly of the frame 12 and extends transversely to the forward direction beneath the draft member 14 and substantially beyond opposite lateral sides of the frame 12 for harvesting a wide swath of crop material from the field as the mobile frame 12 advances forwardly behind the towing tractor. The header 24 includes conventional crop treating or harvesting elements, such as a sickle bar 26, a reel (not shown) and a converging auger 28, being driven through conventional mechanical driveline components (not shown) by a suitable source of hydraulic power (not shown). The standing crop material is cut and delivered rearwardly by these elements as the machine 10 is towed forwardly across the field.

A pair of upper and lower elongated rolls 30 are generally horizontally and rotatably mounted by box-like housing structure 32 of the main frame portion 16 which is fixed at its upper side to the underside of the tubular member 20 and extends below it rearwardly of the header 24. The rolls 30 are rotatably driven in opposite directions through suitable conventional mechanical drive components (not shown) being driven also from the hydraulic power source (not shown). The rolls 30 receive the crop material, as it is moved rearwardly through an opening in the rear side of the header 24 by the crop treating elements thereof, and conditions the crop material as it moves rearwardly into a bite defined between the rolls 30. From the rolls 30, the conditioned crop material is deposited in a swath or windrow back on the field.

An improved system for suspending the header 24 on the frame 12 is incorporated in the machine 10, such system being included in the invention claimed in the first co-pending patent application cross-referenced above. The system is comprised by two suspension assemblies 34 (FIGS. 3 and 6) laterally spaced along the forward side of the frame 12, with only the left assembly 34 being shown in FIG. 1. The following description of the left assembly 34 will suffice for a complete understanding of this improved system, since the two assemblies are identical in structure and operation and, therefore, such description is equally applicable to the right assembly 34.

Each suspension assembly 34 includes a pair of vertically spaced apart lower and upper means pivotally mounting the header 24 at respective lower and upper portions thereof to respective lower and upper parts of the main frame portion 16 of the frame 12. The lower means comprises an elongated link 36 pivotally connected to the lower header portion at 38 and to the lower end of one side member 22 of main frame portion 16 at 40. The upper means comprises an elongated arm 42 being pivotally mounted on one outer end of the tubular member 20 of main frame portion 16 at 44 and having front and rear portions 46, 48 which respectively extend forwardly and rearwardly from the location 44. The forward end of front portion 46 of arm 42 is pivotally connected to the upper header portion at 50. Resilient means in the form of a spring (or a pair of springs if desired) 52 is also provided by each of the suspension assemblies 34. The spring 52 is coupled at one end to the rearward end of rear arm portion 48 at 54 and extends therefrom generally downwardly and is coupled at its opposite end to the lower end of one side member 22 of main frame portion 16 at 56. By such arrangement, the springs 52 of the assemblies 34 yieldably counterbalance the weight of the header 24 and thereby support the header 24 in an operating position relative to the field (as shown in solid line form in FIG. 1), while at the same time enable the header 24 to floatingly follow the contour of the field, as the machine 10 is towed across the field.

According to another improved feature of the machine 10 included in the invention claimed in the first co-pending patent application cross-referenced above, lift means in the form of at least one hydraulic cylinder 58 is provided being mounted on the main frame portion 16 and being actuatable through suitable hydraulic controls (not shown) to effect upward lifting of the header 24 relative to the frame 12 and the field for positioning the header 24 in a raised, non-operating position. Specifically, the cylinder 58 is pivotally anchored at its cylinder end at 60 to one of the frame side members 22 generally intermediately along its length. A support member 62 is pivotally connected at its rear end to the frame tubular member 20 at 44 and extends therefrom forwardly so as to underlie the front portion 46 of one arm 42. The cylinder 58 is pivotally connected at its piston rod end at 64 to the forward end of the support member 62. Upon extension of the cylinder 58, it pivots the support member 62 in a clockwise direction and thereby forces it against the underside of the front arm portion 46 which, in turn, causes clockwise pivoting of the arm 42 and thereby upward lifting of the header 24 to its raised, non-operating position, as illustrated in broken line form in FIG. 1.

DISPOSING THE MACHINE AT OFFSET HARVESTING POSITIONS

As described hereinabove, the draft member 14 is pivotally mounted at its rear end 66 to the elongated tubular member 20 of the main frame portion 16 at a central location therealong. Such central pivotal mounting location facilitates disposing of the machine 10 anywhere between lateral positions offset from the right and left rear sides of the towing tractor for harvesting crop located at either side of the tractor.

An upright post 68, being fixed at a central location along the upper side of tubular member 20 of the main frame portion 16, as clearly seen in FIG. 2, mounts the rear end 66 of the draft member 14 for pivotal movement about a generally vertical axis. Referring now to the schematic representation of the machine 10 in FIG. 9, it will be apparent that the draft member 16 has a generally elongated straight portion 70 which is spaced above the header 24 and extends forwardly from the post 68 above the header 24 and merges with an inclined portion 72 which extends downwardly and forwardly. The portion 72 has a hitch element 74 fixed at the lower front end thereof adapted for pivotal connection to the tractor hitch 76 for securing the machine 10 to the tractor while at the same time allowing relative pivotal movement between the draft member 14 and the tractor about a generally vertical axis.

The draft member 14 may be selectively pivoted relative to the machine 10 through actuation of means, generally indicated by numeral 78, being coupled between the tubular member 20 of the main frame portion 16 and the rear end 66 of the draft member 14. As seen in FIGS. 1 and 2, and more clearly in FIGS. 3, 5 and 6, the actuating means 78 includes linkage, designated by numeral 80, and a hydraulic cylinder 82.

Also, the actuating means 78 includes a tab 84 fixed to and protruding rearwardly from the rear end 66 of the draft member 14.

The hydraulic cylinder 82, being of the double acting type, is pivotally anchored at its cylinder end at 86 to a plate 88 fixed on the tubular member 20 of the main frame portion 16 at a location remote from the rear end 66 of the draft member 14.

The linkage 80 of the actuating means 78 includes a first link 90 pivotally coupled at one end at 92 to an outer end of the tab 84 and at an opposite end at 94 to the piston rod end of the cylinder 82. Also, the linkage 80 includes a second link 96 pivotally coupled at one end at 98 to a bracket 100 fixed to and extending forwardly from the tubular member 20, such that the pivot point 98 is located adjacent to and forwardly of the rear end 66 of the draft member 14. The second link 96 extends to an opposite end located adjacent to and generally rearwardly of the rear end 66 of the draft member 14 and is pivotally coupled also at 94 to the piston rod end of the cylinder 82. As clearly seen in FIG. 5, the second link 96 has an arcuate profile which projects in a direction away from the rear end 66 of the draft member 14 such that upon pivotal movement of the link 96 to adjacent the rear end 66 of the draft member 14, an imaginary line connecting the ends of the link 96 at pivot points 94, 98 extends through the rear end 66 of the draft member 14 and the upright post 68 fixed on the tubular member 20 of the main frame portion 16.

For field operation of the machine 10 at either the left or right rear sides of the tractor, it is readily seen in FIG. 8 that the actuating means 78 must be capable of pivoting the draft member 14 through an approximately 90 degrees displacement. However, for conversion of the machine 10 to its road transporting orientation of FIG. 6, the actuating means 78 must be capable of pivoting the draft member 14 through an additional approximately 30°.

The mounting arrangement, profile and length of the second link 96, and the positional relationship it maintains between the first link 90, the pivotal mounting location of the draft member 14 and the piston rod end of the cylinder 82, provides for pivotal displacement of the draft member 14 through approximately 120° to any of the positions of the draft member 14 located at or between that of FIG. 5 and that of FIG. 6 upon the application of a substantially uniform level of pushing or pulling force on the tab 84 and hence by imposition of a generally uniform level of hydraulic pressure in the cylinder 82.

Extension of the cylinder 82 to its position shown in FIG. 5 through selected actuation of suitable hydraulic controls (not shown) causes clockwise movement of the first link 90 along an arcuate path located rearwardly of and about the rear end 66 of the draft member 14 and pivotal movement of the second link 96 toward the rear end 66 of the draft member 14, both being moved to their respective positions as seen in FIG. 5. Such movement of the first link 90, in turn, pivots the draft member 14 to the position of FIG. 5 wherein it longitudinally extends to a location adjacent to and forwardly of the right side of the header 24. With the draft member 14 in such position, the machine 10 will be located offset from the rear left side of the tractor for harvesting crop located at the left side of the tractor.

Partial retraction of the cylinder 82 to its position shown in FIG. 3 causes counterclockwise movement of the first link 90 along the arcuate path and pivotal movement of the second link 96 away from the rear end 66 of the draft member 14, both being moved to their respective positions as seen in FIG. 3. Such movement of the first link 90, in turn, pivots the draft member 14 to the position of FIGS. 3 and 8 wherein it longitudinally extends to a location adjacent to and forwardly of the left side of the header 24. With the draft member 14 in such position, the machine 10 will be located offset from the rear right side of the tractor for harvesting crop located at the right side of the tractor.

Such extension or partial retraction of the cylinder 82 (or actuation thereof to any position therebetween) may be actuated either as the machine 10 is being towed by the tractor or when the movement of the tractor and the machine 10 has stopped. Irregardless of which, upon continued towing of the machine 10 forwardly behind the tractor, the machine will automatically move to a position behind the right rear side of the tractor if the draft member 14 extends to the left side of the header 24 or to a position behind the left rear side of the tractor if the draft member 14 extends to the right side of the header 24, since opposite pivoting of the draft member 14 relative to the tractor about its pivotal connection therewith results, due to the fact that ground engaging wheels 102 of the mobile auxiliary frame portion 18 of the machine 10 rotate about horizontal axes, preferably being common to one another, aligned transversely to the forward pulling direction of the tractor.

The above-described structure which facilitates disposing of the machine 10 anywhere between such aforementioned lateral offset positions for harvesting crop located at either side of the tractor constitutes still another improved feature incorporated by the machine 10, such improved structure being included in the invention claimed in the second co-pending patent application cross-referenced above.

Full retraction of the hydraulic cylinder 82 places the draft member 14 at its position shown in FIG. 6. As mentioned above, the draft member 14 will be pivoted to such position upon conversion of the machine 10 from its field operating to its road transporting orientation, as will be described hereinafter.

CONVERTING THE MACHINE FROM FIELD OPERATING TO ROAD TRANSPORTING ORIENTATIONS

As described hereinabove, the frame 12 of the machine 10 includes a main frame portion 16 supported in overlying relation by a mobile auxiliary frame portion 18. Conversion of the machine 10 from its field operating to its road transporting orientation involves realignment of the auxiliary frame portion 18 with respect to the main frame portion 16 in coordination with pivotal movement of the draft member 14 relative to the main frame portion 16 to the position shown in FIG. 6 wherein it longitudinally extends generally parallel to the longitudinal extent of the elongated tubular member 20 of the main frame portion 16.

The mobile auxiliary frame portion 18 includes first structure, generally designated 104, supporting the main frame portion 16 in overlying relation, second structure, generally designated 106, supporting the first structure 104 and the rotatable spaced apart ground wheels 102 mounted to and supporting the second structure 106.

As shown in greater detail in FIGS. 10, 11, 13 and 14, the first structure 104 includes a tubular member 108 and an upright hollow bushing 110 (containing suitable bearing means) fixedly mounted along the tubular member 108 by a rigid strap 112. The bushing 110 receives the lower portion of an upright pivot shaft 114 being fixed at its upper portion within a hollow beam 116 having a triangular cross-sectional shape and forming the bottom of the box-like housing structure 32 of the main frame portion 16. By such arrangement, the main frame portion 16 and the first structure 104 of the mobile auxiliary frame portion 18 are pivotal in relation to each other about a generally vertical axis defined by the concentrically arranged bushing 110 and shaft 114.

Means in the form of a hydraulic cylinder 118 interconnect the auxiliary frame portion 18 and the main frame portion 16 and is actuatable through selected actuation of suitable hydraulic controls (not shown) for causing relative pivotal movement between frame portions 16, 18. Specifically, the hydraulic cylinder 118, being of the double acting type, is pivotally anchored at its cylinder end at 120 to aa plate 122 fixed on the underside of the triangular-shaped beam 116 and is pivotally connected at its piston rod end at 124 to another plate 126 fixed on the underside of the first structure tubular member 108.

The second structure 106 of the auxiliary frame portion 18 includes an elongated cylindrical member 128 and a pair of spaced apart transversely extending arms 130 respectively fixed to opposite ends of the cylindrical member 128 and extending generally rearwardly in similar fashion therefrom. The tubular member 108 of the first structure 104 is concentrically mounted about the cylindrical member 128 of the second structure 106 between the arms 130 thereof. By such arrangement, the second structure cylindrical member 128 supports the first structure tubular member 108 and is rotatable in relation thereto about a generally horizontal axis defined by the members 108, 128. Each of the ground wheels 102 is rotatably mounted at 132 to an outer, rearward end of one of the arms 130 about a common horizontal axis which generally extends parallel to the horizontal axis of rotation defined by the members 108, 128.

Means in the form of a hydraulic cylinder 134 is also provided interconnecting the first structure tubular member 108 and one of the arms 130 of the second structure 106 and actuatable through selected actuation of suitable hydraulic controls (not shown) for rotating the second structure 106 and the ground wheels 102 relative to the first structure 104. Specifically, the hydraulic cylinder 134 is disposed above and generally parallel to the left arm 130, being pivotally connected at its piston rod end at 136 to a bracket 138 fixed to the outer end of the left arm 130 and pivotally anchored at its cylinder end at 140 to another bracket 142 fixed to the left end of the first structure tubular member 108.

As seen in FIGS. 2, 3 and 11, when the frame 12 of the machine 10 is disposed in its field operating orientation, the triangular-shaped beam 116 of the main frame portion housing structure 32 is generally disposed above, parallel to, and rearwardly of, the second structure cylindrical member 128 and the first structure tubular member 108 of the auxiliary frame portion 18. In such orientation, a bracket 144, being fixed to the underside of the beam 116 at the right end thereof, couples with the upperside of the right end of the second structure cylindrical member 128 such that the main frame portion 16 is supported by the auxiliary frame portion 18 at the spaced apart locations of the bushing 110 and the right end of the cylindrical member 128. Upon conversion of the frame 12 to its road transporting orientation as seen in FIG. 6 (the steps involved in such conversion being described hereinafter), the main frame portion 16 and the auxiliary frame portion 18 pivotally move in relation to each other such that the forward end of the header 24 is brought into overlying relationship to the right ground wheel. Upon such movement, the bracket 144 on the right end of beam 116 uncouples from the right end of the cylindrical member 128 and the main frame portion 16 is now supported by the auxiliary frame portion 18 only at the location of the bushing 110.

Conversion of the machine 10 from its field operating orientation shown in FIGS. 1 and 3 to its road transporting orientation shown in FIG. 6, basically involves two steps.

In the first step, the main frame portion 16 and the header 24, being in transverse alignment to the forward towing direction, are moved generally upwardly relative to the field from a lowered position as seen in FIG. 1, wherein the header 24 is disposed adjacent the field forwardly of the wheels 102, to a raised position as seen in FIG. 7, wherein the header 24 is disposed remote from the field forwardly and above the wheels 102.

In the preferred embodiment, the same hydraulic line (not shown) supplies pressurized fluid to both cylinder 58 and cylinder 134. Since cylinder 58, with the assistance of floatation springs 52, serves to lift only the header 24 which is a lesser weight than that of the overall machine which is lifted by cylinder 134, when such hydraulic line is supplied with pressurized fluid the cylinder 58 extends first to lift the header to its broken line, raised position of FIG. 1. Then, when the cylinder 58 has fully extended, the cylinder 134 will be fully extended, by the supply of pressurized fluid, from its FIG. 1 condition to its FIG. 7 condition which rotates the first structure 104 and the second structure 106 relative to each other and thereby lifts the overall machine upwardly with relation to the field and the ground wheels 102 from its lowered position of FIG. 1 through a maximum height to its raised position of FIG. 7. Once the FIG. 7 position of the machine is reached, the cylinders 58 and 134 are hydraulically locked by suitable hydraulic controls (not shown) in such extended conditions.

While the above-described order in the actuations of cylinders 58 and 134 is preferred, it is not essential that cylinder 58 be utilized during the first step in machine conversion for assisting in positioning the header 24 at a sufficient elevation such that the underside of the header 24 clears the top of the right wheel 102. Alternatively, the arms 130 mounting the wheels 102 may be of sufficient length such that only by extending the cylinder 134, the header 24 will be elevated high enough to clear the top of right wheel 102 during the second step in the conversion operation.

In the second step of the machine conversion operation with the overall machine now disposed in the FIG. 7 position and its header 24 still disposed in transverse alignment to the forward towing direction, the draft member 14 (being either in or between its right or left longitudinally extending positions) and the mobile auxiliary frame portion 18 are each respectively pivoted counterclockwise relative to the main frame portion 16, as viewed in FIG. 3, in a coordinated or generally simultaneous manner which gives the overall effect of the main frame portion 16 and the header 24 pivoting clockwise relative to both the draft member 14 and the auxiliary frame portion 18 with both of the latter remaining almost stationary.

In order to effect the aforementioned pivotal movements, pressurized fluid is supplied along a suitable hydraulic line (not shown) to the left end of the double acting hydraulic cylinder 82 which causes full retraction thereof and thereby pivoting of the draft member 14 to its FIG. 6 position and such fluid is also supplied along a suitable hydraulic line (not shown) to the left end of the double acting hydraulic cylinder 118 which causes retraction thereof and thereby pivoting of the mobile auxiliary frame portion 18 to its FIG. 6 position in which header 24 now overlies the right end of the auxiliary frame portion 18 and its right ground wheel 102. Once the FIG. 6 position of the machine is reached, the cylinders 82 and 118 are hydraulically locked by suitable hydraulic controls (not shown) in such retracted conditions.

It will be readily understood that the machine 10 may be converted back from its road transporting orientation to its field operating orientation by performance of the operations of the above-described second step and then the first step in reverse.

The arrangement of a suitable hydraulic system for actuating all of the above-described operative components of the machine 10 would be readily apparent to one skilled in the art and thus need not be illustrated or described in detail for a complete understanding of the improvement comprising the present invention.

In brief, the hydraulic system utilized includes a pump mounted to and driven by the tractor power takeoff, a reservoir for hydraulic fluid provided by the hollow interior of the draft member 14 and a hydraulic motor mounted to, and forwardly of, the tubular member 20 of the main frame portion 16. A hydraulic fluid supply line interconnects the pump with the lower forward end of the inclined portion 72 of the draft member 14 through which line the pump draws out fluid from the reservoir. Another hydraulic fluid supply line is arranged along the longitudinal extent of the draft member 14 and interconnects the pump and the hydraulic motor. Fluid under pressure is supplied along this latter line by the pump to the motor for operating the motor. Still another hydraulic fluid supply line interconnects the hydraulic motor and the draft member 14 adjacent its rear end 66 for providing a path for flow of fluid from the motor back to the reservoir. The motor powers the conditioner rolls 30 and the harvesting elements of the header 24 through operative interconnection therewith by conventional mechanical driveline components. Therefore, the tractor operator may control the operation of the header 24 and the rolls 30 by controlling the actuation of the tractor power takeoff.

The hydraulic system utilized further includes the above-described hydraulic cylinders 58, 82, 118 and 134 which are supplied with hydraulic fluid under pressure for their actuation by suitable hydraulic fluid supply lines arranged along the longitudinal extent of the draft member 14 and connected with the hydraulic system of the towing tractor. The tractor needed for operating the aforementioned cylinders of the machine is of the type which has a twin hydraulic system. Such type of tractor is in common use today. Therefore, the tractor operator may control the actuation of the aforementioned cylinders by controlling the actuation of the tractor hydraulic system.

It is thought that the invention and many of its attendant advantages will be understood from the foregoing description and it will be apparent that various changes may be made in the form, construction and arrangement of the parts of the machine described without departing from the spirit and scope of the invention or sacrificing all of its material advantages, the form hereinbefore described being merely a preferred embodiment thereof.

Having thus described the invention, what is claimed is:

1. In a crop harvesting machine movable in a forward direction across a field and being of the type which includes an elongated crop material harvesting means, improved apparatus for facilitating conversion of said harvesting means from field operating to road transporting orientations which comprises:

first structure supporting said harvesting means, said first structure and said harvesting means being pivotal in relation to each other about a generally upright axis;

second structure supporting said first structure and being rotatable in relation thereto about a generally horizontal axis;

rotatable spaced apart ground wheels mounted to and supporting said second structure at locations similarly offset from said horizontal axis;

means for rotating said second structure and ground wheels relative to said first structure so as to effect relative movement between said wheels and said first structure and thereby move said harvesting means relative to said wheels and the field between a lowered position in which said harvesting means is disposed adjacent the field and a raised position in which said harvesting means is disposed remote from the field; and means for pivoting said first structure and said harvesting means relative to each other about said upright axis, when said harvesting means is at its raised position, so as to facilitate conversion of said harvesting means from a field operating orientation in which said harvesting means axially extends generally transverse to said forward direction of machine movement across the field to a road transporting orientation in which said harvesting means axially extends generally parallel to said forward direction of machine movement across the field.

2. The machine as recited in claim 1, wherein said ground wheels are rotatable about a common horizontal axis extending generally parallel to said horizontal axis of rotation of said first and second structures.

3. The machine as recited in claim 1, wherein said second structure includes:

an elongated cylindrical member rotatably supporting said first structure; and spaced apart transversely extending arms respectively fixed to said cylindrical member, said ground wheels being respectively rotatably mounted to said arms.

4. The machine as recited in claim 3, wherein said first structure includes a tubular member concentrically mounted about said cylindrical member of said second structure between said arms thereof.

5. The machine as recited in claim 4, wherein:
said first structure further includes a first pivot element fixed along said tubular member thereof; and
said harvesting means includes a second pivot element, said first and second pivot elements being concentrically arranged together and defining said upright axis.

6. The machine as recited in claim 5, wherein said harvesting means further includes a coupling element laterally spaced from said second pivot element so as to couple with one of said second structure cylindrical member or said first structure tubular member when said harvesting means is disposed in said field operating orientation and uncouple from said one of said members upon conversion of said harvesting means to said road transporting orientation.

7. The machine as recited in claim 4, wherein said means for rotating said second structure relative to said first structure includes extensible and retractable means interconnecting and capable of acting between said first structure tubular member and at least one of said arms on said second structure cylindrical member.

8. The machine as recited in claim 4, wherein said means for pivoting said first structure and said harvesting means relative to each other includes extensible and retractable means interconnecting and capable of acting between said first structure tubular member and said harvesting means.

9. In a crop harvesting machine movable in a forward direction across a field and being of the type which includes a main frame and an elongated crop material harvesting header mounted to said main frame and extending along a forward side thereof, improved apparatus for facilitating conversion of said header from field operating to road transporting orientations which comprises:
first structure supporting said main frame in overlying relation, said first structure and main frame being pivotal in relation to each other about a generally upright axis;
second structure supporting said first structure and being rotatable in relation thereto about a generally horizontal axis;
rotatable spaced apart ground wheels mounted to and supporting said second structure at locations similarly offset from said horizontal axis;
means interconnecting said first and second structures and actuatable for rotating said second structure and said wheels relative to said first structure so as to effect relative movement between said wheels and said first structure and thereby move said main frame and header relative to said wheels and the field between a lowered position in which said header is disposed adjacent the field forwardly of said wheels and a raised position in which said header is disposed forwardly and above said wheels; and
means interconnecting said first structure and said main frame and actuatable for pivoting said first structure and main frame relative to each other about said upright axis, when said main frame and header are at said raised position, so as to facilitate conversion of said header from a field operating orientation in which said header extends generally transverse to said forward direction of machine movement across the field to a road transporting orientation in which said header extends generally parallel to said forward direction and overlies said second structure and one of said ground wheels.

10. The machine as recited in claim 9, wherein said second structure includes:
an elongated cylindrical member rotatably supporting said first structure; and
spaced apart transversely extending arms respectively fixed to said cylindrical member, said ground wheels being respectively rotatably mounted to said arms.

11. The machine as recited in claim 10, wherein said first structure includes a tubular member concentrically mounted about said cylindrical member of said second structure between said arms thereof.

12. The machine as recited in claim 11, wherein said actuatable means for rotating said second structure and said wheels relative to said first structure is a hydraulic cylinder interconnecting and acting between said tubular member of said first structure and at least one of said wheel arms of said second structure.

13. The machine as recited in claim 11, wherein:
said first structure further includes a first pivot element fixed along said tubular member thereof; and
said main frame includes a second pivot element, said first and second pivot elements being concentrically arranged together and defining said upright axis.

14. The machine as recited in claim 13, wherein said main frame further includes a coupling element laterally spaced from said second pivot element so as to couple with one of said second structure cylindrical member or said first structure tubular member when said header is disposed in said transverse alignment in said field operating orientation and uncouple from said one of said members upon conversion of said header to said parallel alignment in said road transporting orientation.

15. The machine as recited in claim 11, wherein said actuatable means for pivoting said first structure and said main frame relative to each other is a hydraulic cylinder interconnecting and acting between said tubular member and said main frame.

16. The machine as recited in claim 9, wherein said improved apparatus further comprising:
an elongated draft member pivotally mounted at its rear end to said main frame about a generally upright axis, said draft member extending to a forward end which is adapted for attachment to a towing vehicle; and
means coupled between said rear end of said draft member and said main frame for causing relative pivotal movement between said draft member and said main frame so as to further facilitate conversion of said header between said field operating and road transporting orientations.

17. In a crop harvesting machine movable in a forward direction across a field behind a towing vehicle and being of the type which includes an elongated crop material harvesting means, improved apparatus for converting said harvesting means between field operating and road transporting orientations which comprises:
mobile means supporting said harvesting means, said mobile means and said harvesting means being pivotal in relation to each other about a first upright axis;
first hydraulic actuating means coupled between said mobile means and said harvesting means for pivoting said mobile means and said harvesting means relative to each other about said first upright axis between a field operating orientation in which said mobile means supports said harvesting means in a generally transverse alignment to said forward direction of machine movement during harvesting operation across the field and a road transporting orientation in which said mobile means supports said harvesting means in a generally parallel alignment to said forward direction;

an elongated draft member pivotally mounted at its rear end upon said harvesting means about a second upright axis, said draft member extending longitudinally forward from said harvesting means to a forward end which is adapted for attachment to said towing vehicle; and second hydraulic actuating means coupled between said harvesting means and said rear end of said draft member for pivoting said draft member and said harvesting means relative to each other about said second upright axis, whereby coordinated actuation of said first and second actuating means effects relative pivoting between said harvesting means and said mobile means about said first upright axis and between said harvesting means and said draft member about said second upright axis and thereby pivoting of said harvesting means with respect to said mobile frame and draft member between its generally transverse alignment in said field operating orientation and its generally parallel alignment in said road transporting orientation.

18. In a crop harvesting machine movable in a forward direction across a field behind a towing vehicle and being of the type which includes a main frame and an elongated crop material harvesting header mounted to said main frame, improved apparatus for converting said header between field operating and road transporting orientations which comprises:

a mobile auxiliary frame supporting said main frame in overlying relation, said auxiliary frame and main frame being pivotal in relation to each other about a first upright axis;

first means interconnecting said auxiliary frame and main frame and actuatable for pivoting said auxiliary frame and main frame relative to each other about said first upright axis between a field operating orientation in which said auxiliary frame supports said main frame with said header in a generally transverse alignment to said forward direction of machine movement during harvesting operation across the field and a road transporting orientation in which said auxiliary frame supports said main frame with said header in a generally parallel alignment to said forward direction;

an elongated draft member pivotally mounted at its rear end upon said main frame about a second upright axis at a generally central location between opposite lateral sides of said main frame and above an upper portion thereof, said draft member extending longitudinally forward from said main frame to a forward end which is adapted for attachment to said towing vehicle; and second means coupled between said main frame and said rear end of said draft member and actuatable for pivoting said draft member and main frame relative to each other about said second upright axis, whereby coordinated actuation of said first and second means effects relative pivoting between said main frame and auxiliary frame about said first upright axis and between said main frame and draft member about said second upright axis and thereby pivoting of said header with respect to said draft member and auxiliary frame between its generally transverse alignment in said field operating orientation and its generally parallel alignment in said road transporting orientation.

19. The machine as recited in claim 18, wherein:
said header extends along a forward side of said main frame and substantially beyond said opposite lateral sides of said main frame; and
said draft member extends longitudinally forward from said main frame above said header.

20. The machine as recited in claim 18, wherein said mobile auxiliary frame includes:
first structure supporting said main frame in overlying relation, said first structure and main frame being pivotal in relation to each other about said first upright axis;
second structure supporting said first structure and being rotatable in relation thereto about a generally horizontal axis;
rotatable spaced apart ground wheels mounted to and supporting said second structure at locations similarly offset from said horizontal axis; and
third means interconnecting said first and second structures and actuatable for rotating said second structure and said ground wheels relative to said first structure so as to effect relative movement between said wheels and said first structure when said header is in its transverse alignment in said field operating orientation and thereby move said main frame and header relative to said wheels and the field between a lowered position in which said header is disposed adjacent the field and a raised position in which said header is disposed remote from the field.

21. The machine as recited in claim 20, wherein said second structure includes:
an elongated cylindrical member rotatably supporting said first structure; and
spaced apart transversely extending arms respectively fixed to said cylindrical member, said ground wheels being respectively rotatably mounted to said arms.

22. The machine as recited in claim 21, wherein said first structure includes a tubular member concentrically mounted about said cylindrical member of said second structure between said arms thereof.

23. The machine as recited in claim 22, wherein:
said first structure further includes a first pivot element fixed along said tubular member thereof; and
said main frame includes a second pivot element, said first and second pivot elements being concentrically arranged together and defining said first upright axis.

24. The machine as recited in claim 23, wherein said main frame further includes a coupling element laterally spaced from said second pivot element so as to couple with one of said second structure cylindrical member or said first structure tubular member when said header is disposed in said transverse alignment in said field operating orientation and uncouple from said one of said members upon conversion of said header to said parallel alignment in said road transporting orientation.

25. The machine as recited in claim 22, wherein said actuatable means for rotating said second structure and said wheels relative to said first structure includes extensible and retractable means interconnecting and capable of acting between said first structure tubular member and at least one of said arms on said second structure cylindrical member.

26. The machine as recited in claim 22, wherein said actuatable means for pivoting said first structure and main frame relative to each other includes extensible and retractable means interconnecting and capable of acting between said first structure tubular member and said main frame.

27. The machine as recited in claim 18, wherein said second means includes:
linkage means pivotally coupled at one end to said rear end of said draft member and at another end to said main frame at a location thereon adjacent to said rear end of said draft member; and
extensible and retractable means pivotally coupled at one end to said main frame at a location thereon remote from said rear end of said draft member and at an opposite end to said linkage means at a location thereon between said ends of said linkage means.

28. The machine as recited in claim 27, wherein:
said second means further includes a tab fixed to and protruding from one side of said rear end of said draft member; and
said linkage means of said second means comprises a first link pivotally coupled at one end to an outer end of said tab and at an opposite end to said opposite end of said extensible and retractable means, and a second link pivotally coupled at one end to said main frame at a location thereon adjacent to an opposite side from said one side of said rear end of said draft member, said second link extending to an opposite end located adjacent said one side of said rear end of said draft member and pivotally coupled to said opposite end of said extensible and retractable means, whereby extension and retraction of said extensible and retractable means causes movement of said first link along an arcuate path located adjacent said one side of said rear end of said draft member and pivotal movement of said second link toward and away from said rear end of said draft member and thereby relative pivotal movement between said main frame and said draft member about said upright axis.

29. The machine as recited in claim 28, wherein said second link has an arcuate profile which projects away from said rear end of said draft member such that upon pivotal movement of said second link to adjacent said rear end of said draft member an imaginary line connecting said one end and opposite end of said second link extends through said rear end of said draft member.

30. The machine as recited in claim 18, wherein:
said draft member at its forward end also is adapted for pivotal movement relative to said vehicle about a third upright axis;
said second means further is actuatable for causing selected pivoting of said draft member relative to said main frame about said second upright axis, when said auxiliary frame supports said main frame with said header in said generally transverse alignment in said field operating orientation, such that said draft member extends to any position located from adjacent the forward left side of said main frame and said header mounted thereto to adjacent the forward right side thereof, said pivotal movement of said draft member relative to said main frame in turn causing opposite pivoting of said draft member relative to said vehicle about said third upright axis, due to said main frame being supported by said auxiliary frame with said header in said transverse alignment, to thereby provide for towing of said machine by said vehicle and disposing of said main frame and header at any selected position between offset of the right and of the left rear sides of said vehicle during field harvesting operation.

31. The machine as recited in claim 30, wherein:
said header extends along a forward side of said main frame and substantially beyond said opposite lateral sides of said main frame; and
said draft member extends longitudinally forward from said main frame above said header.

* * * * *